(12) United States Patent
Tanaka

(10) Patent No.: US 8,345,121 B2
(45) Date of Patent: Jan. 1, 2013

(54) IMAGE PROCESSING APPARATUS, METHOD, AND PROGRAM

(75) Inventor: Seiji Tanaka, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/471,016

(22) Filed: May 14, 2012

(65) Prior Publication Data

US 2012/0224079 A1 Sep. 6, 2012

Related U.S. Application Data

(62) Division of application No. 12/434,871, filed on May 4, 2009, now abandoned.

(30) Foreign Application Priority Data

May 9, 2008 (JP) ................................. 123046/2008

(51) Int. Cl.
*H04N 5/235* (2006.01)
*H04N 5/228* (2006.01)
*H04N 5/217* (2011.01)
*H04N 9/68* (2006.01)
*G06K 9/40* (2006.01)

(52) U.S. Cl. .................. 348/229.1; 348/222.1; 348/234; 348/241; 382/254

(58) Field of Classification Search .................. 348/241, 348/275, 222.1, 229.1, 96; 382/167, 254
See application file for complete search history.

(56) References Cited

U.S. PATENT DOCUMENTS

| 7,525,579 B2 * | 4/2009 | Katagiri | 348/234 |
| 7,587,089 B2 * | 9/2009 | Lin et al. | 382/205 |
| 7,978,927 B2 * | 7/2011 | Kao et al. | 382/274 |
| 2002/0047911 A1 | 4/2002 | Tsuchiya et al. | |
| 2006/0158529 A1 * | 7/2006 | Katagiri | 348/222.1 |
| 2008/0252791 A1 * | 10/2008 | Mitsunaga | 348/673 |

(Continued)

FOREIGN PATENT DOCUMENTS

JP 5-300376 A 11/1993

(Continued)

OTHER PUBLICATIONS

Notice of Grounds for Rejection, dated Dec. 27, 2011, issued in corresponding JP Application No. 2008-123046, 5 pages in English and Japanese.

(Continued)

*Primary Examiner* — Jason Chan
*Assistant Examiner* — Pritham Prabhakher
(74) *Attorney, Agent, or Firm* — Sughrue Mion, PLLC

(57) ABSTRACT

An image processing apparatus, including a region setting unit for setting regions on a processing target image in which each pixel of the image is included according to a level of each pixel, a low frequency image generation unit for generating a low frequency image of the processing target image, a gain calculation unit for calculating a gain for each pixel of the processing target image such that the lower the level the greater the gain, wherein the unit calculates the gain such that pixels in each of the regions in which each pixel of the processing target image is included have substantially the same gain based on a region setting result and a level of each pixel of the low frequency image, and a processing unit for generating a processed image by performing dynamic range compression on the processing target image based on the gain.

4 Claims, 10 Drawing Sheets

U.S. PATENT DOCUMENTS

2010/0026857 A1* 2/2010 Bok et al. .................. 348/241

FOREIGN PATENT DOCUMENTS

| JP | 10-75364 A | 3/1998 |
| --- | --- | --- |
| JP | 2000-156797 A | 6/2000 |
| JP | 2001-275015 A | 10/2001 |
| JP | 2007-074373 A | 3/2007 |
| JP | 2007-096509 A | 4/2007 |

OTHER PUBLICATIONS

First Notice of Opinion on Examination, dated Jun. 21, 2012, issued in corresponding CN Application No. 200910139190.4, six pages in English and Chinese.

* cited by examiner

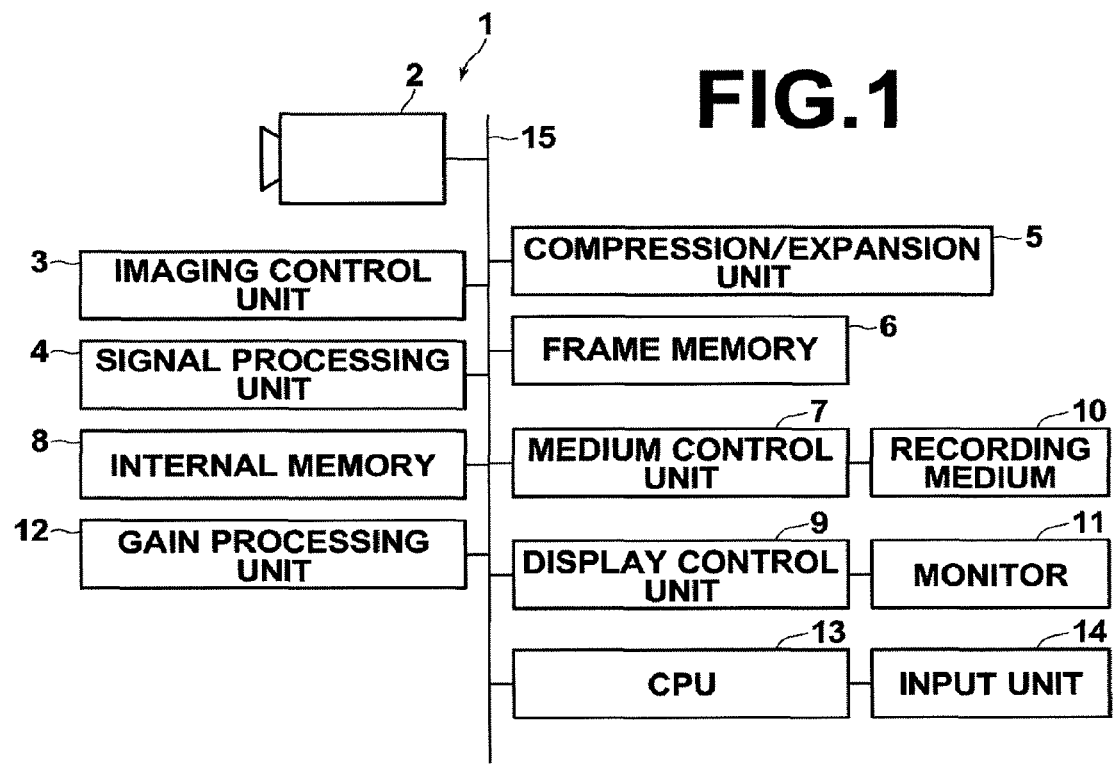
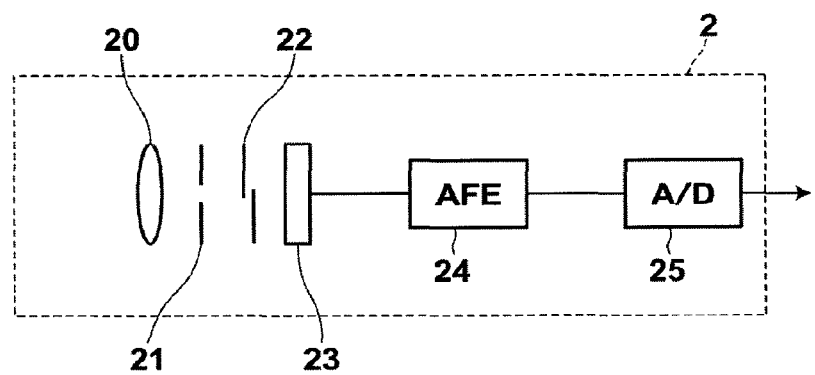

FIG.5

| 255 | 255 | 255 | 255 | 255 |
|---|---|---|---|---|
| 1 | 255 | 255 | 255 | 255 |
| 1 | 1 | 255 | 255 | 255 |
| 1 | 1 | 1 | 255 | 255 |
| 1 | 1 | 1 | 1 | 255 |

FIG.6

| 170 | 255 | 255 | 255 | 255 |
|---|---|---|---|---|
| 85 | 170 | 255 | 255 | 255 |
| 1 | 85 | 170 | 255 | 255 |
| 1 | 1 | 85 | 170 | 255 |
| 1 | 1 | 1 | 85 | 170 |

FIG.10

| 0.3 | 0.5 | 0.5 | 0.5 | 0.5 |
|---|---|---|---|---|
| 5 | 0.3 | 0.5 | 0.5 | 0.5 |
| 10 | 5 | 0.3 | 0.5 | 0.5 |
| 10 | 10 | 5 | 0.3 | 0.5 |
| 10 | 10 | 10 | 5 | 0.3 |

FIG.11

| 0.43 | 0.43 | 0.43 | 0.43 | 0.43 |
|---|---|---|---|---|
| 5.8 | 0.43 | 0.43 | 0.43 | 0.43 |
| 5.8 | 5.8 | 0.43 | 0.43 | 0.43 |
| 5.8 | 5.8 | 5.8 | 0.43 | 0.43 |
| 5.8 | 5.8 | 5.8 | 5.8 | 0.43 |

FIG.17

| 227 | 227 | 227 | 227 | 227 |
|---|---|---|---|---|
| 35 | 227 | 227 | 227 | 227 |
| 35 | 35 | 227 | 227 | 227 |
| 35 | 35 | 35 | 227 | 227 |
| 35 | 35 | 35 | 35 | 227 |

IMAGE PROCESSING APPARATUS, METHOD, AND PROGRAM

This application is a divisional of U.S. application Ser. No. 12/434,871, filed May 4, 2009, which claims priority to JP 2008-123046, filed May 9, 2008, each of which is incorporated herein by reference in its entirety.

BACKGROUND OF THE INVENTION

1. Field of the Invention

The present invention relates to an image processing method and apparatus for compressing the dynamic range of an image by changing the gain of the image. The invention also relates to a computer readable recording medium on which is recorded a program for causing a computer to perform the image processing method.

2. Description of the Related Art

Reproduction of images after performing appropriate image processing is common practice in various fields. For example, a dynamic range compression method is proposed. The method generates a low frequency image of an image and reduces the contrast of a high luminance region, a low luminance region, or the entire image such that the difference between the maximum luminance value and minimum luminance value, i.e., dynamic range is reduced using the low frequency image. More specifically, a low frequency image of an image is generated, then a gain is calculated from the low frequency image such that the darker (i.e., the lower the luminance value) the low frequency image the higher the gain, and the calculated gain is added to each pixel or each pixel is multiplied by the gain.

The dynamic range compression allows for making a bright region of an image darker and a dark region of the image brighter. Thus, for example, a high contrast image of a person taken against light can be turned into a high quality image by correcting halation in the background and dark collapsed person's face.

In the dynamic range compression method described above, however, artifacts, such as overshooting, undershooting, and the like occur adjacent to an edge on an image, which cause a problem of image quality degradation. Consequently, methods for preventing such artifacts are proposed as described, for example, in Japanese Unexamined Patent Publication No. 10 (1998)-075364 (Patent Document 1) and Japanese Unexamined Patent Publication No. 5 (1993)-300376 (Patent Document 2). The method described in Patent Document 1 compresses the dynamic range of an image by generating a plurality of band-limited image signals of different frequency bands from an image signal representing the image, generating a cumulative signal by integrating the band-limited image signals in which some of them are reduced before integrated, converting a differential signal obtained by subtracting the cumulative signal from the image signal of the original image by a predetermined function, and adding the signal obtained by the conversion to the original image. The method described in Patent Document 2 is a method that calculates a correction value for dynamic range compression by making comparison in magnitude of pixel value between an image and a low frequency image thereof.

The method described in Patent Document 1, however, is not able to completely eliminate overshooting or undershooting adjacent to an edge included in an image, since the dynamic range compression is performed based on frequency separation of the image. The method described in Patent Document 2 may cause a processed image to be discontinuous at a position where the correction value is changed, since the correction value is calculated based on the magnitude of pixel value between an image and a low frequency image thereof.

The present invention has been developed in view of the circumstances described above, and it is an object of the present invention to improve image quality of a dynamic range compressed image.

SUMMARY OF THE INVENTION

A first image processing apparatus of the present invention is an apparatus, including:

a region setting unit for setting one or more regions on a processing target image in which each pixel of the image is included according to a level of each pixel;

a low frequency image generation unit for generating a low frequency image of the processing target image;

a gain calculation unit for calculating a gain for each pixel of the processing target image such that the lower the level the greater the gain, wherein the unit calculates the gain such that pixels in each of the one or more regions in which each pixel of the processing target image is included have substantially the same gain based on a region setting result and a level of each pixel of the low frequency image; and a processing unit for generating a processed image by performing dynamic range compression on the processing target image based on the gain.

In the image processing apparatus described above, the gain calculation unit may be a unit that calculates a provisional gain for each pixel of the low frequency image such that the lower the level the greater the gain and, based on the region setting result, calculates a representative value of the provisional gains of pixels in each of the one or more regions in which each pixel of the processing target image is included as the gain for each pixel of the processing target image.

As for the "representative value of the provisional gains", the average value, weighted average value, or intermediate value of the provisional gains, or the like, may be used.

Still further, in the image processing apparatus described above, the gain calculation unit may be a unit that calculates, based on the region setting result, a representative value of pixels in each of the one or more regions in which each pixel of the low frequency image is included, and calculates the gain for each pixel of the processing target image such that the lower the level of the representative value the greater the gain.

As for the "representative value of pixels", the average value, weighted average value, or intermediate value of the pixels, or the like, may be used.

A second image processing apparatus of the present invention is an apparatus, including:

a low frequency image generation unit for generating a plurality of low frequency images of different frequency bands from a processing target image;

a region setting unit for setting one or more regions on at least one of those of the plurality of low frequency images up to a predetermined frequency band, which is higher than a first frequency band, in which each pixel of the at least one low frequency image is included according to a level of each pixel of the at least one low frequency image;

a gain calculation unit for calculating a first gain for each pixel of a first low frequency image of the first frequency band such that the lower the level the greater the gain, calculating, based on a region setting result, a representative value of the first gains of pixels in each of the one or more regions in which each pixel of a second low frequency image of a second frequency band, which is next higher than the first frequency band, is included as a second gain of each pixel of the second low frequency image, and outputting a second gain calculated by repeating the calculation of a new second gain using a low frequency image of the next higher frequency band than that of the second low frequency image as a new second low frequency image and the second gain as a new first gain to the predetermined frequency band as a final gain of each pixel of the processing target image; and a processing unit for generating a processed image by performing dynamic range compression on the processing target image based on the gain.

A photographing apparatus of the present invention is an apparatus, including:

an imaging unit for obtaining a processing target image by photographing a subject; and the first or second image processing apparatus of the present invention.

A first image processing method of the present invention is a method including the steps of:

setting one or more regions on a processing target image in which each pixel of the image is included according to a level of each pixel;

generating a low frequency image of the processing target image;

when calculating a gain for each pixel of the processing target image such that the lower the level the greater the gain, calculating the gain such that pixels in each of the one or more regions in which each pixel of the processing target image is included have substantially the same gain based on a region setting result and a level of each pixel of the low frequency image; and generating a processed image by performing dynamic range compression on the processing target image based on the gain.

A second image processing method of the present invention is a method including the steps of:

generating a plurality of low frequency images of different frequency bands from a processing target image;

setting one or more regions on at least one of those of the plurality of low frequency images up to a predetermined frequency band, which is higher than a first frequency band, in which each pixel of the at least one low frequency image is included according to a level of each pixel of the at least one low frequency image;

calculating a first gain for each pixel of a first low frequency image of the first frequency band such that the lower the level the greater the gain;

calculating, based on a region setting result, a representative value of the first gains of pixels in each of the one or more regions in which each pixel of a second low frequency image of a second frequency band, which is next higher than the first frequency band, is included as a second gain of each pixel of the second low frequency image; and outputting a second gain calculated by repeating the calculation of a new second gain using a low frequency image of the next higher frequency band than that of the second low frequency image as a new second low frequency image and the second gain as a new first gain to the predetermined frequency band as a final gain of each pixel of the processing target image; and generating a processed image by performing dynamic range compression on the processing target image based on the gain.

Each of the first and second image processing methods of the present invention may be provided as a program recorded on a computer readable recording medium for causing a computer to perform the method.

According to the first image processing apparatus and method of the present invention, one or more regions is set on a processing target image in which each pixel of the image is included according to a level of each pixel, and further a low frequency image of the processing target image is generated. Then, based on a region setting result and a level of each pixel of the low frequency image, the gain is calculated such that pixels in each of the one or more regions in which each pixel of the processing target image is included have substantially the same gain, and based on the calculated gain, a processed image is generated by performing dynamic range compression on the processing target image.

In this way, according to the first image processing apparatus and method, substantially the same gain is calculated for pixels in each of the one or more regions of the processing target image in which each pixel of the processing target image is included. Consequently, dynamic range compression of the processing target image does not cause overshooting and undershooting arising from a large pixel value variation adjacent to the boundary of the one or more regions in which each pixel of the image is included. Therefore, a high quality processed image without overshooting and undershooting may be obtained.

Here, the low frequency image represents a brightness variation of the processing target image in a manner such that the lower the frequency band of the low frequency image, the more global will be the variation. Therefore, in order to calculate the gain for changing an overall dynamic range of the processing target image, it is preferable that the frequency band of the low frequency image is as low as possible. On the other hand, if the low frequency image has a very low frequency band in comparison with that of the processing target image, the frequency difference between the two images becomes large, and the blurred range, i.e., variation range of pixel levels in the low frequency image becomes very large at the boundary between the regions in which each pixel of the processing target image is included, so that the use of the region setting result of the processing target image does not yield appropriate gains.

According to the second image processing apparatus and method of the present invention, a plurality of low frequency images of different frequency bands is generated from a processing target image, and one or more regions are set on at least one of those of the plurality of low frequency images up to a predetermined frequency band, which is higher than a first frequency band, in which each pixel of the at least one low frequency image is included according to a level of each pixel of the at least one low frequency image. Then, a first gain is calculated such that the lower the level of each pixel of a first low frequency image of the first frequency band the greater the gain and, based on a region setting result, a representative value of the first gains of pixels in each of the one or more regions in which each pixel of a second low frequency image of a second frequency band, which is next higher than the first frequency band, is included is calculated as a second gain of each pixel of the second low frequency image.

Here, the first and second low frequency images are close to each other in frequency band, so that the difference in blur degree is small. Therefore, the pixel level variation range in the first low frequency image becomes small at the boundary between the regions in which each pixel of the second low frequency image is included, so that the gains for the second low frequency image may be calculated appropriately.

Further, in the second image processing apparatus and method of the present invention, the calculation of a new second gain is repeated using a low frequency image of the next higher frequency band than that of the second low frequency image as a new second low frequency image and the second gain as a new first gain to the predetermined frequency band, and a second gain calculated by this is outputted as a final gain of each pixel of the processing target image.

Consequently, even where the frequency band of the low frequency image is low, by gradually increasing the gain to be calculated and frequency band for region splitting, the gain according to a global brightness variation of the processing target image may be calculated without being influenced by the variation range of pixel levels at the boundary between the regions in which each pixel of the processing target image is included. Accordingly, a high quality processed image without overshooting and undershooting may be obtained.

BRIEF DESCRIPTION OF THE DRAWINGS

FIG. 1 is a schematic block diagram of a digital camera to which the image processing apparatus according to a first embodiment of the present invention is applied, schematically illustrating the configuration thereof.

FIG. 2 illustrates a configuration of the imaging unit shown in FIG. 1.

FIG. 5 is a two-dimensional representation of the luminance values of an image for explaining gain calculation.

FIG. 6 is a two-dimensional representation of the luminance values of a blurred image for explaining gain calculation.

FIG. 10 is a two-dimensional representation of the provisional gains calculated based on the blurred image.

FIG. 11 is a two-dimensional representation of the final gains calculated based on the region setting result.

FIG. 17 illustrates region setting of a blurred image.

Figure 3:
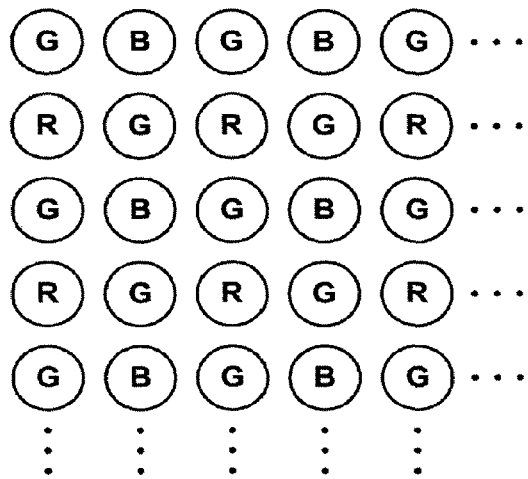
FIG. 3 illustrates an example of a color filter.

DESCRIPTION OF THE PREFERRED
EMBODIMENTS

Hereinafter, embodiments of the present invention will be described with reference to the accompanying drawings. FIG. 1 is a schematic block diagram of a digital camera to which the image processing apparatus according to a first embodiment of the present invention is applied, illustrating the configuration thereof. As illustrated in FIG. 1, digital camera 1 according to the present embodiment includes imaging unit 2, imaging control unit 3, signal processing unit 4, compression/expansion unit 5, frame memory 6, medium control unit 7, internal memory 8, and display control unit 9.

FIG. 2 illustrates a configuration of imaging unit 2. As illustrated in FIG. 2, imaging unit 2 includes lens 20, aperture 21, shutter 22, CCD 23, analog front-end (AFE) 24, and A/D converter 25.

Lens 20 includes a plurality of functional lenses, such as a focus lens for bringing a subject into focus, a zoom lens for realizing a zoom function and the like, and positions of the lenses are controlled by a not shown lens drive unit The aperture diameter of aperture 21 is controlled by a not shown aperture drive unit based on the aperture data obtained by AE processing.

Shutter 22 is a mechanical shutter and driven by a not shown shutter drive unit according to the shutter speed obtained by AE processing.

CCD 23 includes a photoelectric surface having multitudes of light receiving elements disposed two-dimensionally, and a light image representing a subject is formed on the photoelectric surface and subjected to photoelectric conversion, whereby an analog image signal is obtained. A color filter having R, G, and B filters disposed regularly is provided in front of CCD 23.

AFE performs noise reduction and gain adjustment (hereinafter, analog processing) on an analog image signal outputted from CCD 23.

A/D conversion unit 25 converts the analog image signal analog-processed by AFE to a digital signal. The image data obtained by converting the analog image signal obtained by CCD 23 of imaging units 2 are RAW data in which each pixel has a density value of R, G, or B.

Imaging control unit 3 controls imaging after the release button is depressed. It also performs AF and AE processing to set the focal position, aperture value data and shutter speed when the release button is depressed half-way. When the release button is not depressed, imaging control unit 3 controls imaging unit 2 to take a through image.

Signal processing unit 4 performs signal processing, such as white balance correction, tone correction, sharpness correction, and color correction on the digital image data obtained by imaging unit 2.

Compression/expansion unit 5 generates an image file by compressing the image data processed by signal processing unit 4, for example, in JPEG compression format. A header that includes auxiliary information, such as date and time of photographing, and the like, is attached to the image file based on Exif format or the like.

Frame memory 6 is a work memory used when various types of processing, including the processing of signal processing unit 4, are performed on the image data representing the image obtained by imaging units 2.

Medium control unit 7 gains access to recording medium 10 and controls read/write operations of image file.

Internal memory 8 has stored therein various constants to be set in digital camera 1, programs to be executed by CPU 13, and the like.

Display control unit 9 causes image data stored in frame memory 6 or an image recorded in recording medium 10 to be displayed on monitor 11.

Figure 4:
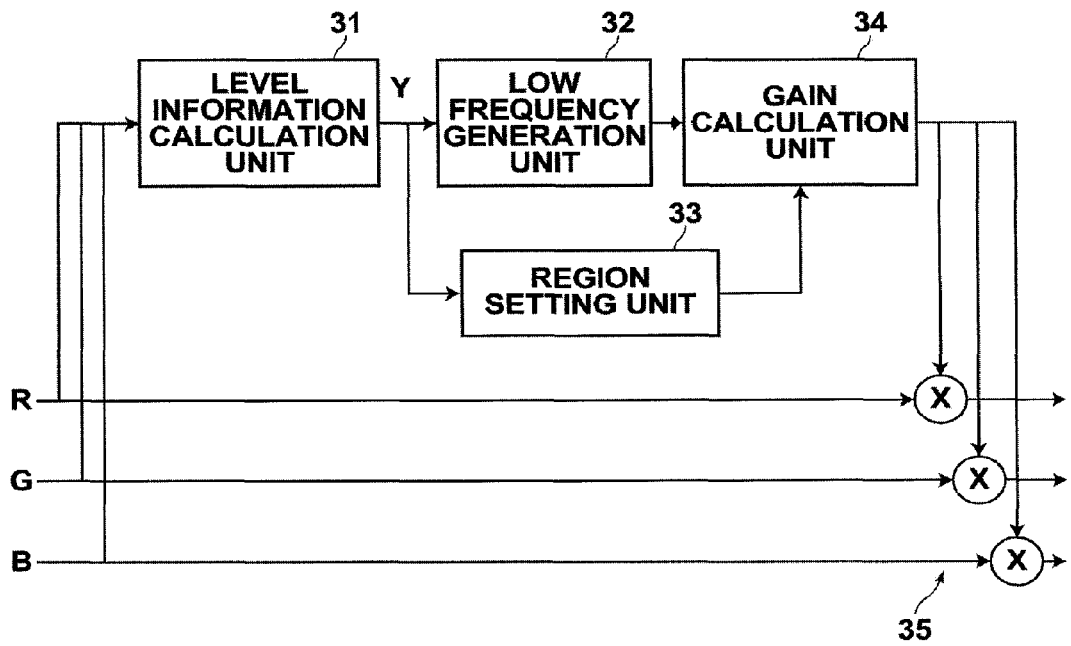
FIG. 4 is a schematic block diagram of the gain processing unit shown in FIG. 1, schematically illustrating the configuration thereof.

Digital camera 1 further includes gain processing unit 12. FIG. 4 is a schematic block diagram of gain processing unit 12, illustrating the configuration thereof. As illustrated in FIG. 4, gain processing unit 12 includes level information calculation unit 31, low frequency image generation unit 32, region setting unit 33, gain calculation unit 34, and multiplication unit 35.

Level information calculation unit 31 calculates the level of each pixel of processing target image S0 (hereinafter, also simply referred to as "image S0") obtained by photographing and not yet subjected to the signal processing. More specifically, level information calculation unit 31 calculates luminance value Y of each pixel as the level by Formula (1) below.

$$Y = 0.299R + 0.587G + 0.114B \quad (1)$$

Here, each pixel of image S0 has only one of R G B values, so that level information calculation unit 31 calculates luminance value Y of each pixel after calculating each of RGB values by performing interpolation operations using RGB values of surrounding pixels. More specifically, for a pixel having a R value shown in FIG. 3, level information calculation unit 31 calculates G and B values by performing interpolation operations using G values of four adjacent pixels in the left/right and up/down directions and B values of four adjacent pixels in the directions diagonal to the left/right and up/down directions. For a pixel having a B value, it calculates G and R values by performing interpolation operations using G values of four adjacent pixels in the left/right and up/down directions and R values of four adjacent pixels in the directions diagonal to the left/right and up/down directions. For a pixel having a G value, it calculates R and B values by performing interpolation operations using R values of two adjacent pixels in the left/right or up/down direction and B values of two adjacent pixels in the left/right or up/down direction.

Low frequency image generation unit 32 generates blurred image Sus0 by filtering image S0 constituted by luminance values Y using a low-pass filter.

Region setting unit 33 sets one or more regions on image S0 in which each pixel of image S0 is included according to the magnitude of luminance value Y of each pixel. More specifically, region setting unit 33 calculates, with respect to each region setting target pixel of image S0, an absolute value of difference between luminance value Y of the target pixel and luminance value Y of another pixel in a predetermined range surrounding the target pixel, and sets an region formed of pixels whose absolute values of difference are within a predetermined threshold value Th1 as the region in which the target pixel is included.

For example, as illustrated in FIG. 5, when image S0 has a diagonal edge and each of luminance values Y in the upper right region is 255 and each of luminance values Y in lower left region is 1, and if the shaded pixel in the center is the region setting target pixel, the region in which the target pixel is included is the upper right region formed of pixels having luminance value Y of 255, since the luminance value Y of 255 is the same value as that of the target pixel. On the other hand, the luminance value Y of 1 differs largely from that of the target pixel, so that the target pixel does not belong to the lower left region.

As shown in FIG. 6, in blurred image Sus0 of image S0 shown in FIG. 5, luminance values Y of the boundary area are reduced in the upper right region and increased in the lower left region, whereby the boundary is blurred.

Figure 7:
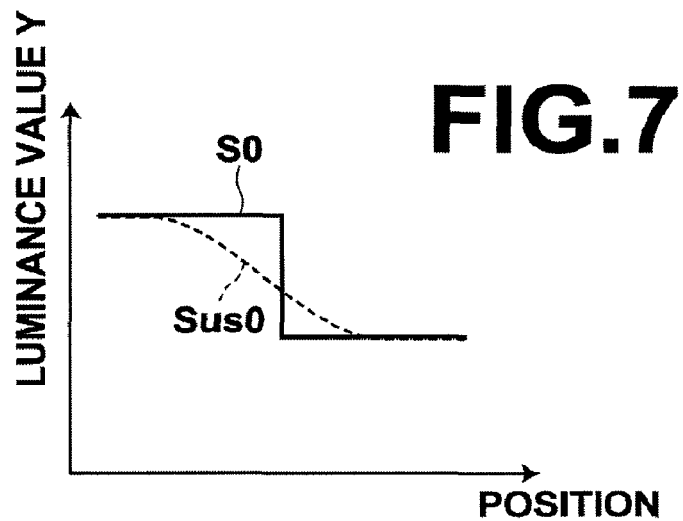
FIG. 7 illustrates a luminance value curve of an edge portion for explaining gain calculation.

Gain calculation unit 34 calculates provisional gains Gk based on blurred image Sus0 such that the darker the portion of image S0 having smaller luminance value Y, the greater the provisional gain. For example, with respect to an edge portion of image S0 shown in FIG. 7, the variation of luminance values Y becomes smooth in blurred image Sus0, as shown by a dashed line in FIG. 7, so that gain calculation unit 34 calculates smoothly varying provisional gains Gk such that the greater the luminance value of blurred image Sus0 the greater the provisional gain, as shown in FIG. 8.

By multiplying the respective pixels of image S0 by provisional gains Gk calculated in the manner as described above, the dynamic range, i.e., contrast of image S0 may be reduced, so that a high contrast image of a person taken against light can be turned into a high quality image by correcting halation in the background and dark collapsed person's face.

Figure 8:
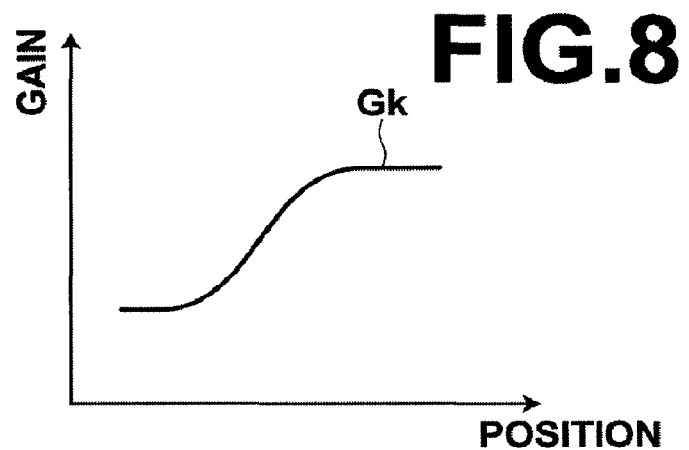
FIG. 8 illustrates a provisional gain curve.
Figure 9:
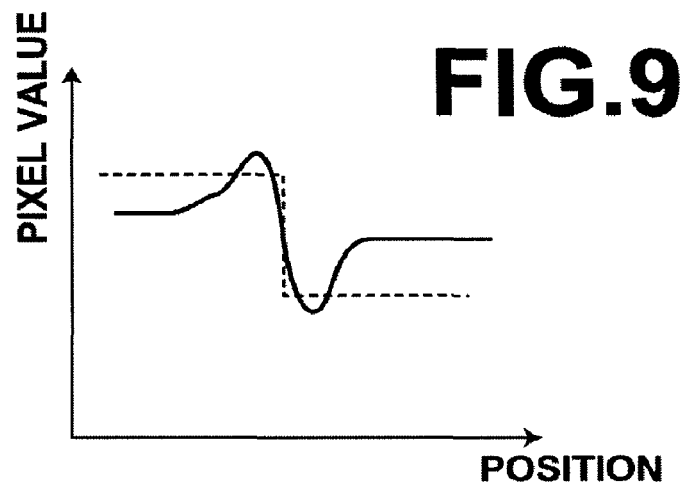
FIG. 9 illustrates the state in which overshooting and undershooting occur.

If the dynamic range compression is implemented by provisional gains Gk shown in FIG. 8, however, overshooting and undershooting occur adjacent to an edge included in image S0, as shown in FIG. 9, thereby image quality is degraded.

Consequently, in the first embodiment, a representative value of provisional gains Gk for pixels in each of the one or more regions of image S0 in which each pixel of image S0 is included is calculated as final gain Gf based on a region setting result. For example, as shown in FIG. 10, where provisional gain Gk for each pixel in the boundary area in the upper right region is 0.3 and provisional gain Gk for each of the other pixels in the upper right region is 0.5, and provisional gain Gk for each pixel in the boundary area in the lower left region is 5 and provisional gain Gk for each of the other pixels in the lower left region is 10, the average value of provisional gains Gk of all pixels in the upper right region is calculated as final gain Gf for the target pixel in the center.

For each pixel in the upper right region, the average value of provisional gains Gk of all pixels is calculated as final gain Gf. This will result in that gain Gf for each pixel in the upper right region is 0.43 and gain Gf for each pixel in the lower left region is 5.8, as shown in FIG. 11.

Figure 12:
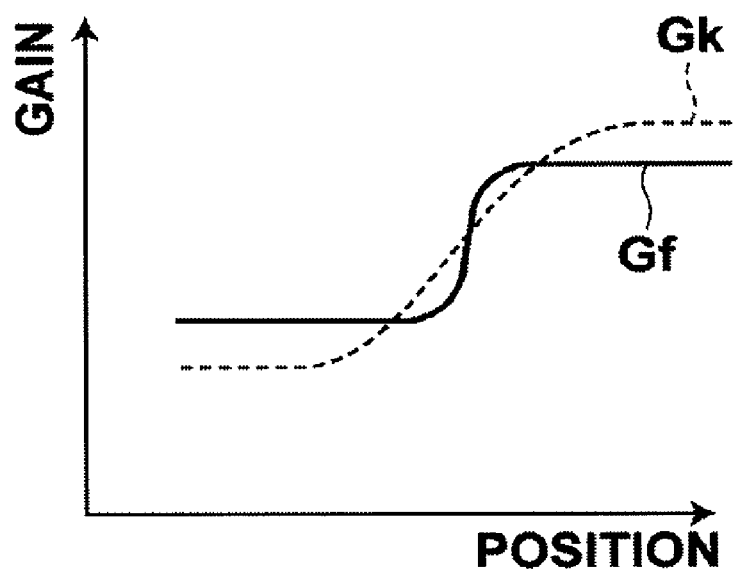
FIG. 12 illustrates provisional and final gain curves.
Figure 13:
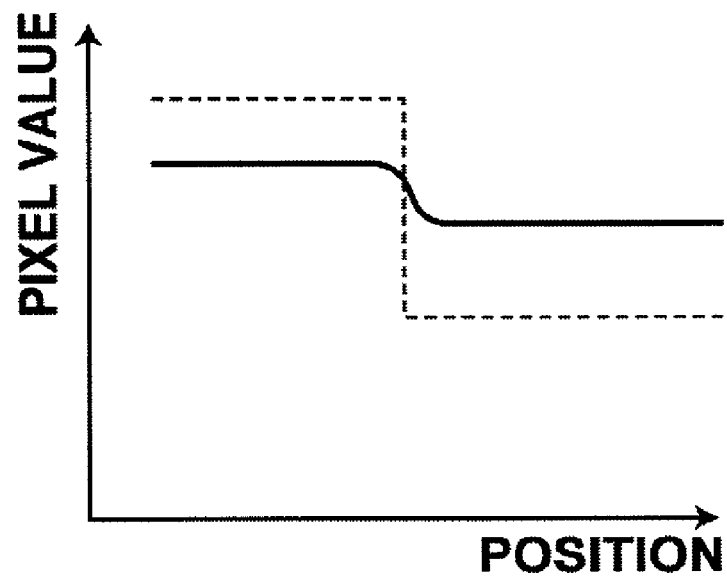
FIG. 13 illustrates a gain processing result according to the first embodiment.

Consequently, final gains Gf are calculated such that the gain variation in the boundary area becomes steeper than that of provisional gains Gk, as shown in FIG. 12. Accordingly, if dynamic range compression is performed on image S0 using final gains Gf, overshooting or undershooting is prevented adjacent to an edge in image S0, as shown in FIG. 13.

CPU 13 controls each unit of digital camera 1 according to a signal from input/output unit 14 that includes an arrow key, various operation buttons, and the release button.

Data bus 15 connects each unit of digital camera 1 and CPU 13, and various types of data and information in digital camera 1 are exchanged through the bus.

Figure 14:
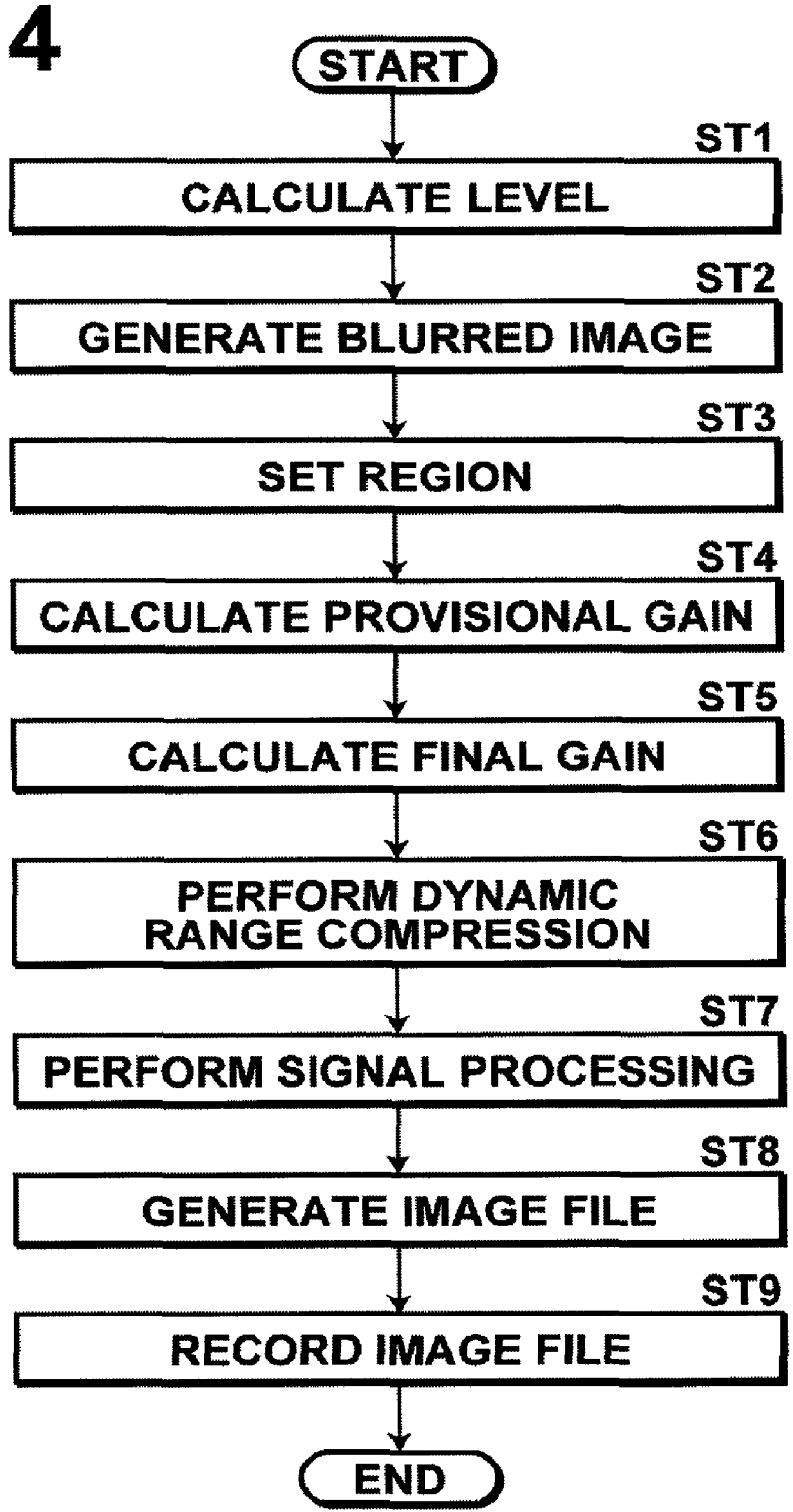
FIG. 14 is a flowchart illustrating processing performed in the first embodiment.

Processing performed in the first embodiment will now be described. FIG. 14 is a flowchart illustrating the processing performed in the first embodiment. Here, processing after an instruction to start photographing is issued by a full depression of the release button and digital image S0 is generated will be described. When image S0 is obtained by photographing, level information calculation unit 31 of gain processing unit 12 calculates the level of each pixel of image S0 (step ST1). Then, low frequency image generation unit 32 generates blurred image Sus0 of image S0 (step ST2), and region setting unit 33 sets one or more regions on image S0 in which each pixel of image S0 is included according to the level of each pixel (step ST3).

Then, gain calculation unit 34 calculates provisional gains Gk according to blurred image Sus0 (step ST4) and calculates final gains Gf based on a region setting result (step ST5). Multiplication unit 35 compresses the dynamic range of image S0 by multiplying each pixel of image S0 by gain Gf, thereby generating dynamic range compressed image S1 (step ST6).

Next, signal processing unit 4 performs signal processing on dynamic range compressed image S1, thereby generating processed image S2 (step ST7). Then, compression/expansion unit 5 generates an image file (step ST8) and medium control unit 7 records the image file on recording medium 10 (step ST9), thereby terminating the processing.

As described above, in the first embodiment, one or more regions are set on image S0 in which each pixel of image S0 is included according to the level of each pixel of image S0, whereby a substantially the same gain is calculated for each pixel in each of the one or more regions. Consequently, dynamic range compression of image S0 does not cause overshooting and undershooting arising from a large pixel value variation adjacent to the boundary of the one or more regions in which each pixel of image S0 is included. Therefore, high quality processed image S2 without overshooting and undershooting may be obtained.

Next, a second embodiment of the present invention will be described. The configuration of a digital camera having an image processing apparatus according to the second embodiment is identical to that of the digital camera having the image processing apparatus according to the first embodiment, so that it will not be elaborated upon further here. The second embodiment differs from the first embodiment only in the processing performed by gain processing unit 12.

The second embodiment differs from the first embodiment in that, in the first embodiment, only one blurred image is generated, while in the second embodiment, a plurality of blurred images of different frequency bands is generated.

Figure 15:
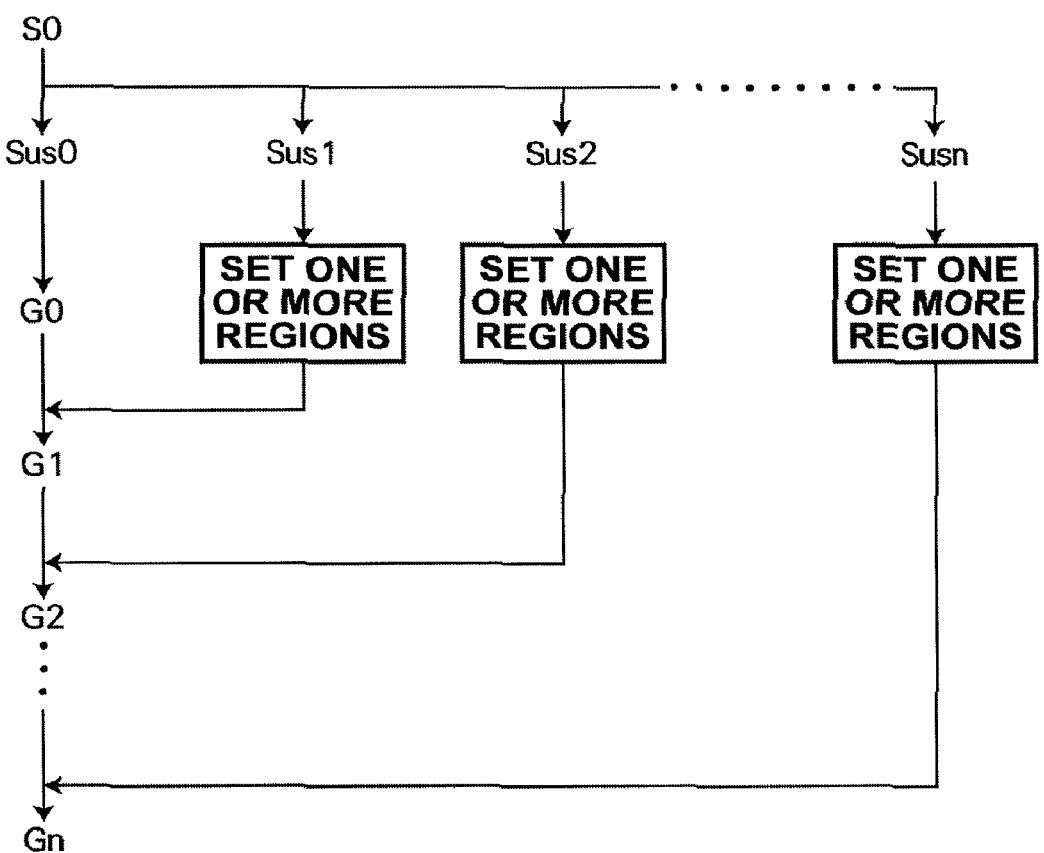
FIG. 15 schematically illustrates processing performed in a second embodiment.

FIG. 15 schematically illustrates processing performed in the second embodiment. As shown in FIG. 15, low frequency image generation unit 32 generates a plurality of blurred images Sus0 to Susn of different frequency bands from image S0 constituted by luminance values Y in the second embodiment. More specifically, low frequency image generation unit 32 generates a plurality of blurred images Sus0 to Susn by filtering image S0 repeatedly using low-pass filters or by performing a multiple resolution conversion by wavelet transform or the like. Here, "n" represents the number of blurred images and the greater the "n" the higher the frequency band of the blurred image.

Further, with respect to blurred images Sus1 to Susn other than blurred image Sus0 of a lowest frequency band, region setting unit 33 sets one or more regions on each of blurred images Sus1 to Susn in which each pixel is included.

In the mean time, gain calculation unit 34 calculates provisional gains G0 based on blurred image Sus0 of the lowest frequency band in the same manner as in the first embodiment. Then, based on a region setting result of blurred image Sus1 of the next higher frequency band than that of blurred image Sus0, gain calculation unit 34 calculates a representative value of provisional gains G0 of pixels in each of the one or more regions of blurred image Sus1 as provisional gain G1 of blurred image Sus1. The calculation of provisional gains G1 is performed in the same manner as the calculation of provisional gains Gk based on blurred image Sus0 and final gain Gf based on the region setting result of image S0 in the first embodiment.

Then, based on the region setting result of blurred image Sus2 of the next higher frequency band than that of blurred image Sus1, gain calculation unit 34 calculates a representative value of provisional gains G1 of pixels in each of the one or more regions of blurred image Sus2 as provisional gains G2 of blurred image Sus2.

Thereafter, gain calculation unit 34 repeats the calculation until provisional gains Gn for blurred image Susn of a highest frequency band is calculated and outputs provisional gains Gn as final gains Gf.

Figure 16:
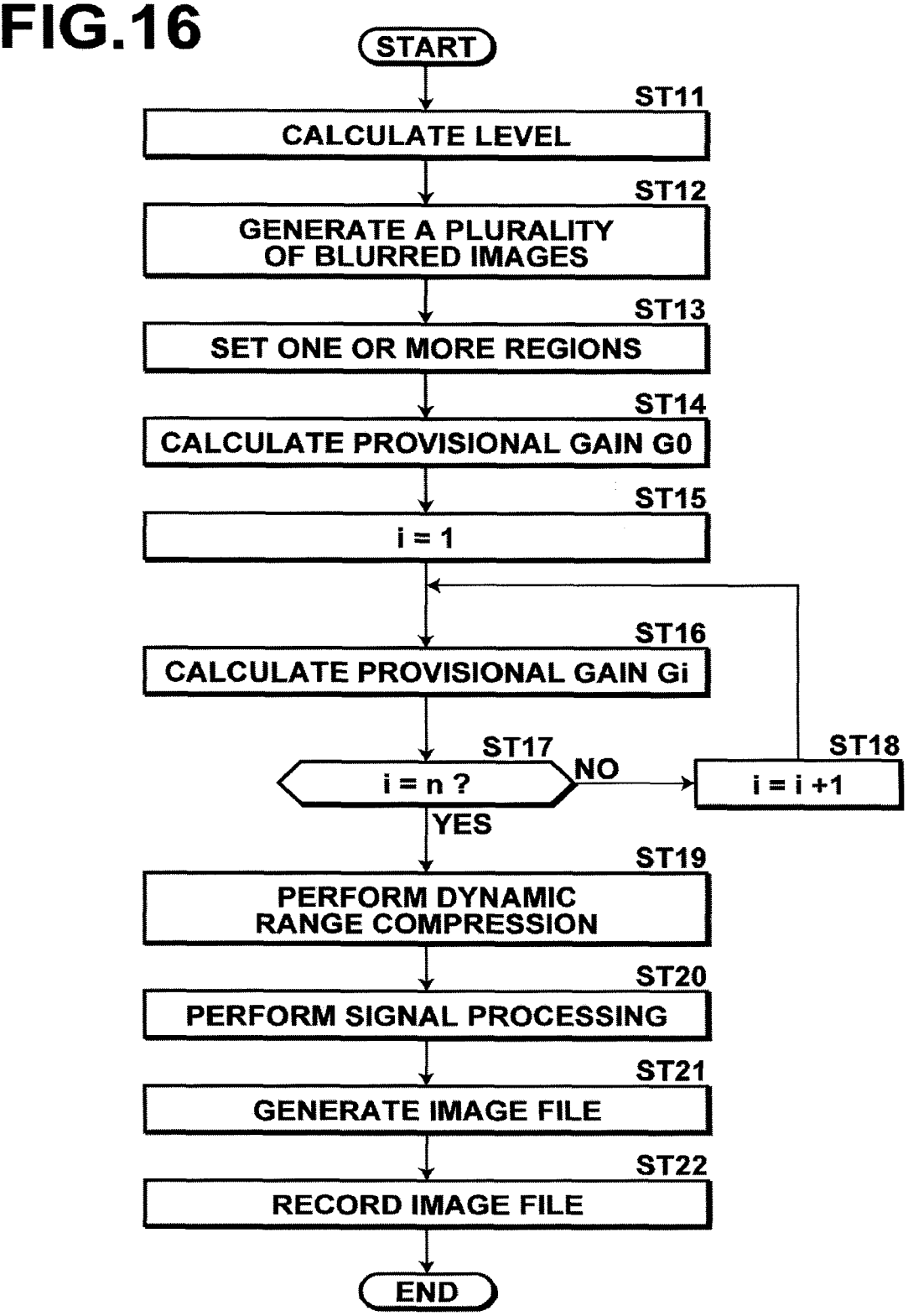
FIG. 16 is a flowchart illustrating the processing performed in the second embodiment.

Next, processing performed in the second embodiment will be described. FIG. 16 is a flowchart illustrating processing performed in the second embodiment. Here, processing after an instruction to start photographing is issued by a full depression of the release button and digital image S0 is generated will be described. When image S0 is obtained by photographing, level information calculation unit 31 of gain processing unit 12 calculates the level of each pixel of image S0 (step ST11). Then, low frequency image generation unit 32 generates a plurality of blurred images Sus0 to Susn from image S0 (step ST12), and region setting unit 33 sets one or more regions on each of images Sus1 to Susn, other than blurred image Sus0 of a lowest frequency band, in which each pixel of each of blurred images Sus1 to Susn is included according to the level of each pixel (step ST13).

Then, gain calculation unit 34 calculates provisional gains G0 based on blurred image Sus0 (step ST14), and sets the blurred image whose region setting result is used to first blurred image Susi (i=1, step ST15), and calculates provisional gains Gi from provisional gains Gi−1 (initial value is G0) based on the region setting result of blurred image Susi (step ST16). Thereafter, a determination is made as to whether or not provisional gains Gi are calculated based on the region setting result of each of all blurred images, i.e., whether or not i=n (step ST17). If step ST17 is negative, the blurred image whose region setting result is used is set to a blurred image of the next higher frequency band (i=i+1, step ST18), and the processing returns to step ST16.

If step ST17 is positive, multiplying unit 25 compresses the dynamic range of image S0 by multiplying each pixel of image S0 by final gain Gf (Gn), thereby generating dynamic range compressed image S1 (step ST19).

Next, signal processing unit 4 performs signal processing on dynamic range compressed image S1, thereby generating processed image S2 (step ST20). Then, compression/expansion unit 5 generates an image file (step ST21) and medium control unit 7 records the image file on recording medium 10 (step ST22), thereby terminating the processing.

In the first embodiment, blurred image Sus0 represents a brightness variation of image S0 in a manner such that the lower the frequency band of blurred image Sus0, the more global will be the variation. Therefore, in order to calculate the gain for changing an overall dynamic range of image S0, it is preferable that the frequency band of blurred image Sus0 is as low as possible. On the other hand, if blurred image Sus0 has a very low frequency band in comparison with that of original image S0, the frequency difference between the two images becomes large, and the blurred range, i.e., level variation range in blurred image Sus0 becomes very large at the boundary between the one or more regions in which each pixel of image S0 is included, so that the use of the region setting result of image S0 does not yield appropriate gains.

According to the second embodiment, a plurality of blurred images Sus0 to Susn of different frequency bands is generated from image S0, and according to the level of each pixel of each of blurred images Sus1 to Susn having higher frequency bands than a lowest frequency band of the plurality of blurred images, one or more regions is set on each of blurred images Sus1 to Susn in which each pixel is included. Then, from provisional gains G0 calculated based on blurred image Sus0 having a lowest frequency band, provisional gains G1 is calculated based on the region setting result of blurred image Sus1, and thereafter the calculation is repeated until provisional gains Gn are calculated based on the region setting result of blurred image Susn having a highest frequency band.

Here, the frequency difference between blurred image Susi−1 and blurred image Susi is small because their frequency bands are close to each other. Therefore, the blurred range, i.e., variation range of pixel levels in blurred image Susi−1 becomes small at the boundary between the regions in which each pixel of image Susi is included, so that gains Gi for blurred image Susi may be calculated appropriately.

Therefore, by gradually increasing the gain to be calculated and frequency band for region splitting, gain Gf according to a global level variation of image S0 may be calculated without being influenced by the blurred range, i.e., variation range of pixel levels in blurred image Sus0 at the boundary between the regions in which each pixel of image S0 is included. Accordingly, high quality processed image S2 without overshooting and undershooting may be obtained.

In the first embodiment, final gain Gf is calculated from a provisional gain calculated from blurred image Sus0 based on the region setting result of image S0. Here, an arrangement may be adopted in which an average value of each pixel of blurred image Sus0 in each of the one or more regions in which each pixel of blurred image Sus0 is included is calculated and a gain for each pixel is calculated based on the average value such that the lower the level of each pixel the greater the gain.

That is, with respect to blurred image Sus0 calculated like that shown in FIG. 6, an average value of luminance values Y of blurred image Sus0 is calculated for the upper right region in which the center pixel is included. FIG. 17 shows the average luminance value calculation result of blurred image Sus0. Note that an average value of luminance values Y for the lower left region is also calculated in FIG. 17. Then, with respect to blurred image Sus0 for which average values are calculated, by calculating gains such that the darker the portion of image S0 having smaller luminance value Y the greater will be the pixel value, gains that do not cause overshooting or undershooting adjacent to an edge in image S0 may be calculated, as in the first embodiment.

In the first and second embodiments, the image processing apparatus of the present invention is applied to a digital camera, but the image processing apparatus may be used as a stand-alone apparatus. In this case, the image processing apparatus is provided with an interface, such as a card reader, for receiving an image obtained by a digital camera or the like.

Further, in the first and second embodiments, luminance value Y is calculated as the pixel level, but RGB average value of each pixel, only G value, or maximum value of RGB values may be used as the pixel level.

Still further, in the first and second embodiments, an average value of gains for pixels in each of one or more regions in which each pixel is included is calculated, but the weighted average according to the distance from each pixel, intermediate value, or the like may be used, instead of the average value.

Further, in the first and second embodiments, a gain to be multiplied to each pixel of image S0 is calculated, but a gain to be added to or subtracted from each pixel may be calculated. In this case, gain processing unit 12 performs gain processing by adding the gain to or subtracting from each pixel of image S0.

Still further, in the first and second embodiments, gains for the entirety of image S0 are calculated and dynamic rang compression is performed for the entirety of image S0, but an arrangement may be adopted in which gains only for a high luminance region or low luminance region are calculated and the dynamic range of only the high luminance region or low luminance region is compressed.

Further, in the second embodiment, the final gain is calculated from provisional gain G0 with respect to blurred image Sus0 having a lowest frequency band, but the frequency band for calculating the provisional gain is not limited to the lowest frequency band and another frequency band other than a predetermined highest frequency band may be used. Still further, it is not necessary to calculate the final gain using region setting results up to blurred image Susn of a highest frequency band, and the final gain may be calculated using region setting results up to blurred image of a predetermined frequency band.

So far, apparatus 1 according to the embodiments of the present invention has been described, but a program for causing a computer to function as means corresponding to level information calculation unit 31, low frequency image generation unit 32, region setting unit 33, gain calculation unit 34, and multiplication unit 35, and to perform processing like that shown in FIGS. 14, and 16 is another embodiment of the present invention. Further, a computer readable recording medium on which is recorded such a program is still another embodiment of the present invention.

What is claimed is:

1. An image processing apparatus, comprising:
a low frequency image generation unit for generating a plurality of low frequency images of different frequency bands from a processing target image;
a region setting unit for setting one or more regions on at least one of those of the plurality of low frequency images up to a predetermined frequency band, which is higher than a first frequency band, in which each pixel of the at least one low frequency image is included according to a level of each pixel of the at least one low frequency image;
a gain calculation unit for calculating a first gain for each pixel of a first low frequency image of the first frequency band such that the lower the level the greater the gain, calculating, based on a region setting result, a representative value of the first gains of pixels in each of the one or more regions in which each pixel of a second low frequency image of a second frequency band, which is next higher than the first frequency band, is included as a second gain of each pixel of the second low frequency image, and outputting a second gain calculated by repeating the calculation of a new second gain using a low frequency image of the next higher frequency band than that of the second low frequency image as a new second low frequency image and the second gain as a new first gain to the predetermined frequency band as a final gain of each pixel of the processing target image; and
a processing unit for generating a processed image by performing dynamic range compression on the processing target image based on the gain.

2. A photographing apparatus, comprising:
an imaging unit for obtaining a processing target image by photographing a subject; and
the image processing apparatus of claim 1.

3. An image processing method, comprising the steps of:
generating a plurality of low frequency images of different frequency bands from a processing target image;
setting one or more regions on at least one of those of the plurality of low frequency images up to a predetermined frequency band, which is higher than a first frequency band, in which each pixel of the at least one low frequency image is included according to a level of each pixel of the at least one low frequency image;
calculating a first gain for each pixel of a first low frequency image of the first frequency band such that the lower the level the greater the gain;
calculating, based on a region setting result, a representative value of the first gains of pixels in each of the one or more regions in which each pixel of a second low frequency image of a second frequency band, which is next higher than the first frequency band, is included as a second gain of each pixel of the second low frequency image; and outputting a second gain calculated by repeating the calculation of a new second gain using a low frequency image of the next higher frequency band than that of the second low frequency image as a new second low frequency image and the second gain as a new first gain to the predetermined frequency band as a final gain of each pixel of the processing target image; and generating a processed image by performing dynamic range compression on the processing target image based on the gain.

4. A non-transitory computer readable recording medium on which is recorded a program for causing a computer to execute an image processing method, the method comprising the steps of:

generating a plurality of low frequency images of different frequency bands from a processing target image;

setting one or more regions on at least one of those of the plurality of low frequency images up to a predetermined frequency band, which is higher than a first frequency band, in which each pixel of the at least one low frequency image is included according to a level of each pixel of the at least one low frequency image;

calculating a first gain for each pixel of a first low frequency image of the first frequency band such that the lower the level the greater the gain;

calculating, based on a region setting result, a representative value of the first gains of pixels in each of the one or more regions in which each pixel of a second low frequency image of a second frequency band, which is next higher than the first frequency band, is included as a second gain of each pixel of the second low frequency image; and outputting a second gain calculated by repeating the calculation of a new second gain using a low frequency image of the next higher frequency band than that of the second low frequency image as a new second low frequency image and the second gain as a new first gain to the predetermined frequency band as a final gain of each pixel of the processing target image; and generating a processed image by performing dynamic range compression on the processing target image based on the gain.

\* \* \* \* \*